(12) United States Patent
Fabian et al.

(10) Patent No.: US 9,507,098 B2
(45) Date of Patent: Nov. 29, 2016

(54) MULTI-FIBER CONNECTOR WITH FERRULE FLOAT

(75) Inventors: David James Fabian, Mount Joy, PA (US); John Anthony Fulponi, Harrisburg, PA (US); Ronald Patrick Heberle, Dauphin, PA (US); James Patrick Mosier, Palmyra, PA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 512 days.

(21) Appl. No.: 13/415,078

(22) Filed: Mar. 8, 2012

(65) Prior Publication Data

US 2013/0236142 A1 Sep. 12, 2013

(51) Int. Cl.
*G02B 6/36* (2006.01)
*G02B 6/38* (2006.01)

(52) U.S. Cl.
CPC .......... *G02B 6/3878* (2013.01); *G02B 6/3885* (2013.01); *G02B 6/3821* (2013.01)

(58) Field of Classification Search
CPC  G02B 6/3885; G02B 6/3807; G02B 6/3893; G02B 6/387; G02B 6/3878
USPC ........ 385/53, 59, 65, 71, 75, 76, 78, 83, 85, 385/88, 134–137
See application file for complete search history.

(56) References Cited

U.S. PATENT DOCUMENTS

| | | | |
|---|---|---|---|
| 5,737,463 A | | 4/1998 | Weiss et al. |
| 5,896,479 A | * | 4/1999 | Vladic ............................ 385/59 |
| 2002/0106163 A1 | | 8/2002 | Cairns |
| 2003/0223703 A1 | | 12/2003 | Chen et al. |
| 2005/0069264 A1 | * | 3/2005 | Luther et al. .................... 385/59 |
| 2007/0025665 A1 | | 2/2007 | Dean, Jr. et al. |
| 2010/0098381 A1 | * | 4/2010 | Larson et al. ................... 385/60 |
| 2010/0129031 A1 | * | 5/2010 | Danley et al. ................... 385/59 |
| 2011/0123157 A1 | * | 5/2011 | Belsan et al. .................... 385/75 |

FOREIGN PATENT DOCUMENTS

| | | |
|---|---|---|
| EP | 0 929 199 A1 | 7/1999 |
| EP | 1 273 944 A1 | 1/2003 |
| WO | 01/37010 A2 | 5/2001 |

OTHER PUBLICATIONS

European Search Report, Mail Date, Jun. 23, 2016, EP 13 15 7318, Application No. 13157318.0—1562/2637049.

* cited by examiner

*Primary Examiner* — Kaveh C Kianni
*Assistant Examiner* — Hung Lam

(57) ABSTRACT

A connector comprising: (a) at least one multi-fiber ferrule having a front face presenting a plurality of fiber end faces, and a back face having a first surface and defining a first orifice through which the fibers pass; (b) a retainer for holding the at least one multi-fiber ferrule, the retainer comprising a front face having a second surface and defining a second orifice through which the fibers pass, the second surface contacting the first surface; wherein at least one of the first or second surface is convex along at least one of an x-axis or a y-axis such that the at least one multi-fiber ferrule is able to move relative to the retainer about at least one of the axes.

13 Claims, 4 Drawing Sheets

MULTI-FIBER CONNECTOR WITH FERRULE FLOAT

FIELD OF INVENTION

The present invention relates generally to multi-fiber connectors, and, more specifically, to multi-fiber connectors with ferrule float to compensate for manufacturing anomalies and other alignment issues.

BACKGROUND OF INVENTION

Optical fiber connectors are a critical part of essentially all optical fiber communication systems. For instance, such connectors are used to join segments of fiber into longer lengths, to connect fiber to active devices, such as radiation sources, detectors and repeaters, and to connect fiber to passive devices, such as switches, multiplexers, and attenuators. The principal function of an optical fiber connector is to hold the fiber end such that the fiber's core is aligned with an optical pathway of the mating structure. This way, light from the fiber is optically coupled to the optical pathway.

Of particular interest herein are backplane connector systems. Backplane connector systems are well known, and typically comprise a substrate or a backplane on which are mounted one or more backplane connectors. A backplane connector is usually a receptacle and is configured to receive a connector plug. The plug connector typically comprises a ferrule that is biased forward with a spring to facilitate physical contact; however, the backplane connector in some industry standards does not have a biased ferrule to save space by avoiding the use of the spring. Space in backplane applications tends to be limited.

Although backplane connection systems tend to be robust and commercially popular, Applicant has discovered problems with respect to unacceptably high return loss (RL) caused by manufacturing anomalies typically found in multi-fiber ferrules, particularly with respect to variations in end face geometry and fiber protrusion. Specifically, referring to the schematic of a back-plane connector system 500 in FIG. 5, manufacturing anomalies, such as, for example, uneven polishing of the ferrule end face, cause an air gap 560 between the fibers 502 of the non-biased ferrule 501 and the forward-biased ferrule 503. (It should be understood that the unevenness of the polished end faces is exaggerated for illustrative purposes.) This problem appears unique to applications in which just one of the two mating ferrules is spring biased, as opposed to both ferrules being spring biased. Although the forward-biased ferrule may overcome some anomalies in ferrule end face/fiber protrusion configurations, if the manufacturing deviations are too extreme, proper optical coupling cannot be made between one or more of the fibers 502. Failure to make physical contact between the fibers is known to cause unacceptable RL and severely degrade the optical performance of the optical coupling.

Therefore, Applicant has discovered a need to accommodate manufacturing anomalies in a multi-fiber connector system. The present invention fulfills this need, among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a connector configuration that facilitates movement of the ferrule relative to the rest of the connector to compensate for manufacturing anomalies, particularly at the end face of the ferrule. Specifically, in a traditional connector, the ferrule is supported by a flat surface of a retainer plate. The flat support surface does not allow the ferrule to float sufficiently to align and compress the fibers to ensure physical contact between them. However, the connector of the present invention uses one or more beveled/curved surfaces between the retainer and the ferrule to enable the ferrule to move relative to the retainer (and thus the rest of the connector). Allowing the ferrule to float during mating enables it to move as needed to achieve proper optical coupling between all the fibers. This results in consistent RL performance across the fiber paths.

One aspect of the invention is a connector having an interface between the ferrule and the retainer that enables the ferrule to move or float relative to the retainer. In one embodiment, the connector comprises: (a) at least one multi-fiber ferrule having a front face presenting a plurality of fiber end faces, and a back face having a first surface and defining a first orifice through which the fibers pass; (b) a retainer for holding the at least one multi-fiber ferrule, the retainer comprising a front face having a second surface and defining a second orifice through which the fibers pass, the second surface contacting the first surface; wherein at least one of the first or second surface is convex along at least one of an x-axis or a y-axis such that the at least one multi-fiber ferrule is able to move relative to the retainer in at least one of the axes.

DETAILED DESCRIPTION

Figure 1:
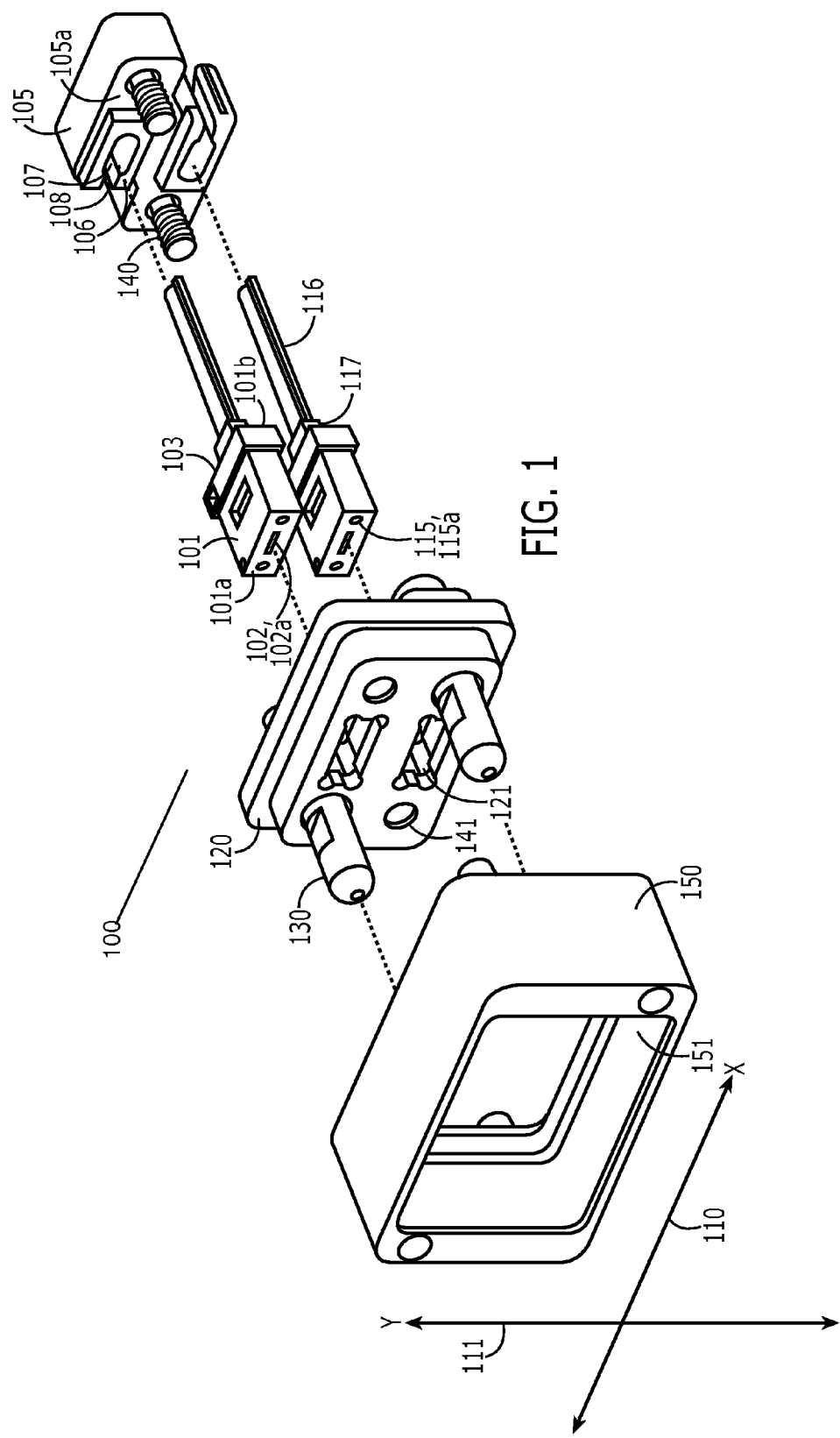
FIG. 1 shows an exploded view of one embodiment of the connector of the present invention.

Referring to FIG. 1, one embodiment of the connector 100 of the present invention is shown. The connector 100 comprises at least one multi-fiber ferrule 101 having a front face 101a presenting a plurality of end faces 102a of fibers 102, and a back face 101b having a first surface 103 and defining a first orifice (not shown) through which fibers 102 pass. The connector also comprises a retainer 105 for supporting the multi-fiber ferrule 101. The retainer comprises a front face 105a having a second surface 106 and defining a second orifice 107 through which the fibers pass. The second surface 106 contacts the first surface 103 to provide a backstop for the ferrule 101. At least one of the first surface 103 or second surface 106 is beveled/curved along at least one of an x-axis 110 or a y-axis 111 such that the multi-fiber ferrule 101 is able to move relative to the retainer about at least one of the axes. Each of these elements is considered in greater detail below.

The ferrule 101 functions to hold each fiber end face in a precise position to facilitate optical coupling with corresponding fibers held in a mating ferrule. Generally, although not necessarily (as discussed below), the ferrule is a standard, commercially available ferrule, such that custom-configured ferrules need not be manufactured and inventoried for this connector. In the embodiment shown in FIG. 1, the multi-fiber ferrule is an MT-type ferrule. MT-type ferrules are well known and, hence, will not be described in detail herein. Although an MT-type ferrule is illustrated herein, it should be appreciated that the invention is not limited to MT-type ferrules and may be used with any multi-fiber ferrule configured to cooperate with a backstop.

The ferrule 101 comprises a front face 101a which comprises one or more rows of fibers 102 having end faces 102a. In this embodiment, just one row of twelve fibers is shown, although it should be understood that multiple rows of varying numbers of fibers may be used. For example, common MT-type ferrules include multiple rows (e.g., 2-6) of twelve fibers. In the embodiment shown in FIG. 1 (as is common in MT-type ferrules), the front face 101a of the ferrule 101 comprises one or more alignment members 115. The alignment members are well known and typically comprise an alignment pin hole 115a, which may or may not be occupied with an alignment pin. In the embodiment of FIG. 1, the alignment pin holes 115a are shown without pins, although the ferrule 101 may be fitted with alignment pins and corresponding pin keeper if need be. The alignment pin holes 115a are configured to receive alignment pins 415b of a corresponding plug connector 400 (shown in FIG. 4).

Extending from the back face 101b of the ferrule is the fiber 102, which, in this particular embodiment, is configured as a ribbon cable 116. To prevent the ribbon cable from being bent beyond its minimum bend radius, a mini boot 117 may be used. Such boots are well known in the art and will not be discussed in detail herein. On the back face 101b of the ferrule 101 is the first surface 103. In a standard MT-type ferrule, the first face 103 would generally be planar such that it would seat up against a second surface 106 as described with respect to the retainer 105 below. However, in the present invention, it may be preferable to bevel/curve the first surface 103 as described below.

It should be understood that the ferrule 101 as described above may be a unitary structure, or it may be a composite structure in which different elements are provided by discrete components. For example, the first surface 103 may be defined on a unitary ferrule, or it may be defined on a discrete component (e.g., a ferrule holder or a pin keeper) that attaches to the ferrule 101.

Figure 2:
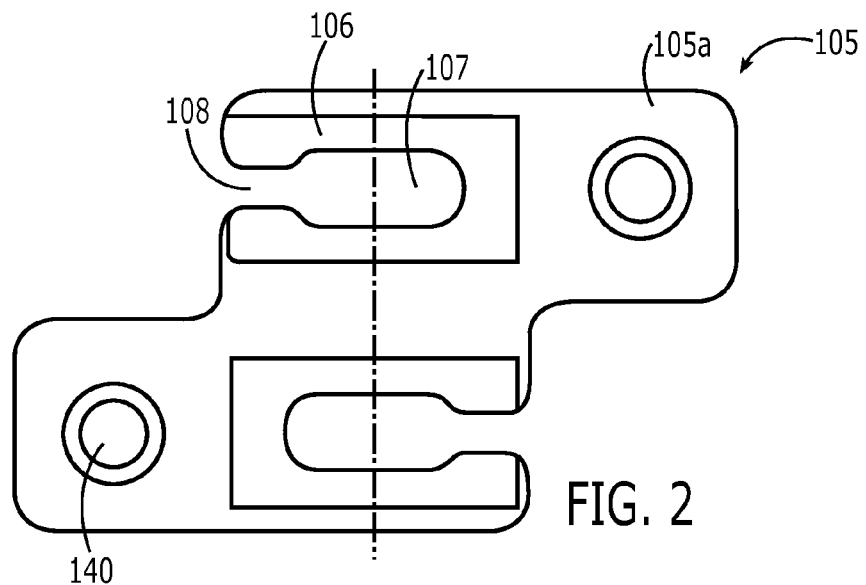
FIG. 2 shows a front view of the retainer shown in the connector of FIG. 1.
Figure 3:
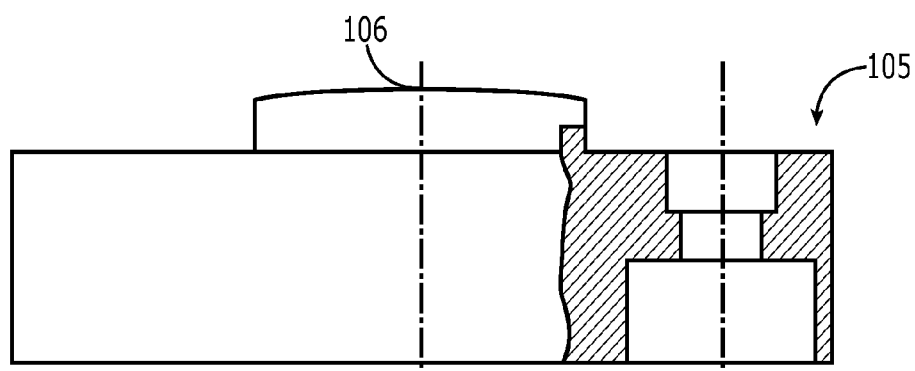
FIG. 3 shows a side view of the retainer of FIG. 2.

The retainer 105 functions to provide support in the form of a backstop for the ferrule 101 when the ferrule of a mating connector urges against it. As shown in FIGS. 2 and 3, the retainer comprises a front face 105a having at least one second surface 106. The second surface defines at least one second orifice 107 through which the fibers 102 (which in this embodiment are combined in a ribbon cable 116) pass. In one embodiment, the retainer also defines a slot 108 to allow access to the second orifice 107. This allows the ribbon cable 116 to be inserted in the second orifice 107 through the slot 108. Although a slot 108 is shown, it should be understood that other embodiments may be practiced within the scope of the invention. For example, depending upon the length of the fibers 102 and whether they are terminated, the distal end of the fibers 102 cable may be threaded through the second orifice 107, thereby obviating the need for the slot 108.

This particular embodiment of the retainer 105 also comprises an alignment/connection member 140 which is configured to interface with a corresponding alignment/connection member 141 in the housing 120 (considered below). In this particular embodiment, the alignment/connection member 140 is a threaded fastener which is received in the threaded opening of alignment/connection member 141.

Figure 5:
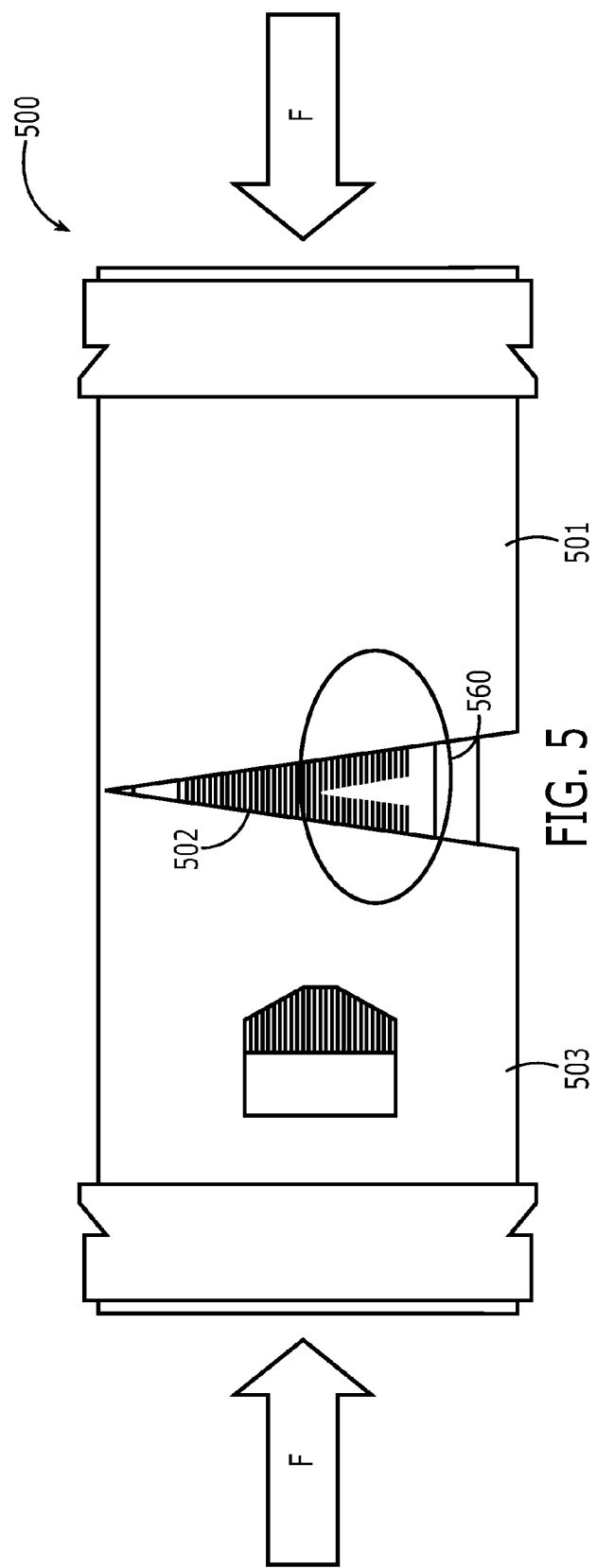
FIG. 5 is a schematic showing the effect manufacturing anomalies have on physical contact between a biased ferrule and a non-biased ferrule of a backplane connector system.

An important aspect of the invention is the interaction of the first and second surfaces 103, 106. At least one of the first surface 103 or the second surface 106 is beveled/curved in at least the x-axis 110 or the y-axis 111. Specifically, rather than being planar, as is the convention, the first surface and/or second surface are convex, and may be beveled with one or more angular facets or may be curved. The curve may be a radiused curve or a non-radiused curve. As used herein, the term "convex" refers collectively to an angled surface and a curved surface. By beveling/curving at least one of these surfaces to create a convex surface, a slight degree of movement between the ferrule 101 and the retainer 105 is facilitated. Such limited movement has been shown to compensate for the manufacturing anomalies described above. More specifically, with respect to FIG. 5, which shows a manufacturing anomaly in which one end of the ferrule is polished more than the other end along the x-axis, if one of the first or second surfaces is convex with respect to the x-axis, then the ferrule 101 is able to turn side-to-side relative to the retainer to accommodate the manufacturing anomaly and enable the fiber ends to close the gap 560 and make physical contact.

In the embodiment shown in FIG. 1, the second surface 106 is convex along the x-axis as shown in FIG. 3, which is a side view of the retainer 105. It should be understood that the bevel/curve need not be severe—just a slight bevel/curve will generally provide sufficient compensation for manufacturing anomalies.

Although the embodiment shown in FIG. 1 has a second surface that is convex just along the x-axis, it should be understood that the surface may also be convex along the y-axis such that the second surface is essentially domed to facilitate relative movement of ferrule along the Y-axis too. In such an embodiment, the ferrule 101 not only turns side-to-side along the x axis, but also tips up-and-down with respect to the y-axis.

Generally, although not necessarily, it is preferred to bevel/curve the second surface 106 rather than the first surface 103 of the ferrule. This approach is preferred generally such that standard ferrules 101 may be used as mentioned above. Nevertheless, it should be understood that the first surface 103 may be convex along one or more axes to accommodate relative movement between the retainer and the ferrule. Such an embodiment may be particularly desirable if the first surface 103 is not integral with the ferrule 101, but rather is defined in a discrete component (e.g., ferrule holder or pin keeper) that is attached to the back face 101b of the ferrule as mentioned above. Additionally, in one embodiment, both the first and second surfaces are convex. In one particular embodiment, the first surface is convex along one axis (e.g., the y-axis) and the second surface is convex along a different axis (e.g., the x-axis).

In the embodiment of FIG. 1, the ferrule 101 is held between the retainer 105 and a first housing 120. The first housing 120 comprises one or more orifices 121 to accommodate the ferrule 101. Additionally, alignment members 130 may be used to interengage corresponding alignment members 430 of a mating connector 400 (see FIG. 4) to facilitate alignment. Such an interface is known in the art, and thus is not considered in detail herein.

In the embodiment FIG. 1, the connector 100 also comprises a second housing 150 configured to interface with the first housing 120. The second housing 150 comprises a cavity 151 that functions to receive the housing 450 of a mating plug connector 400 as shown in FIG. 4 (discussed below).

Figure 4:
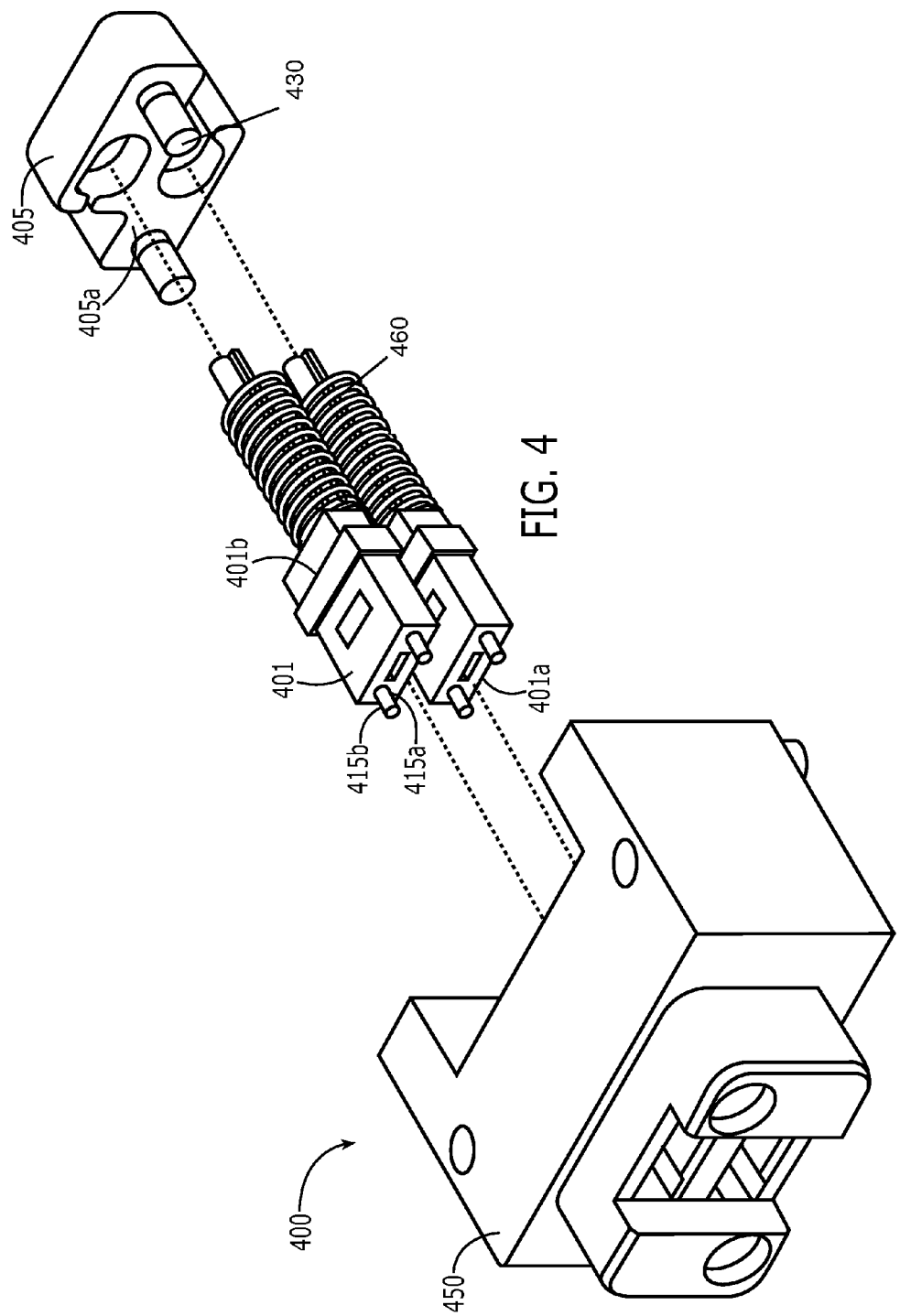
FIG. 4 shows a plug connector adapted to optically couple with the connector of FIG. 1.

In one embodiment, the connector 100 is part of a connector system comprising a second connector 400 as shown in FIG. 4. In one embodiment, the connector 400 is a standard connector, which, in this particular embodiment is an MT-type connector. Like connector 100 in FIG. 1, the second connector 400 comprises a ferrule 401 which is similar, if not identical to ferrule 101, except the alignment pin hole 415a on the front face 401a is occupied with an alignment pin 415b. Like connector 100, the second connector also has a retainer 405 with a front face 405a. However, unlike the interaction of the first and second surfaces 103, 106 of connector 100, the second connector 400 has a resilient member, which, in this embodiment, is a spring 460, disposed between the back face 401b of the ferrule 401 and the front face 405a of the retainer. The spring 460 functions to bias the ferrule 401 forward relative to the retainer 405.

In this particular embodiment, the second connector 400 is a plug connector. Accordingly, the second connector comprises a plug housing 450 to which the retainer 405 interengages to contain the ferrule 401. In this embodiment, the plug housing 450 is configured to be received in the cavity 151 of the connector 100. This is a known configuration and, hence, will not be described in detail herein.

It should be apparent from the above description that the retainer and ferrule configuration of the present invention provides significant advantages over conventional backplane connector configurations, including compensation for manufacturing anomalies with existing connector components. Still other advantages of the present invention are anticipated.

What is claimed is:

1. A connector comprising:
    at least one non-biased, multi-fiber ferrule having a front face presenting a plurality of fiber end faces, and a back face having a first surface and defining a first orifice through which said fibers pass;
    a retainer for holding said at least one non-biased, multi-fiber ferrule, said retainer comprising a front face having a second surface and defining a second orifice through which said fibers pass, said second surface contacting said first surface; wherein at least one of said first or second surface is convex along at least one of an x- axis or a y-axis such that said at least one multi-fiber ferrule is able to move relative to said retainer about at least one of said axes;
    a first housing defining at least one opening to receive said at least one multi-fiber ferrule, said ferrule being at least partially disposed in said opening such that said ferrule can move along at least one of said x or y axes;
    a second housing for holding said first housing, wherein said second housing defines a receptacle for receiving a second connector, wherein said connector does not comprise a spring and said second connector comprises a spring.

2. The connector of claim 1, wherein said first or second surface is curved along at least one of said x-axis or said y-axis.

3. The connector of claim 1, wherein said front face presents said fibers in at least one row along said x-axis, and wherein said first or second surface is convex along said x-axis.

4. The connector of claim 3, wherein said first or second surface is curved.

5. The connector of claim 4, wherein only said second surface is convex.

6. The connector of claim 1, wherein said ferrule and said first surface comprise a unitary structure.

7. The connector of claim 1, wherein said retainer comprises a slot leading to said second orifice.

8. The connector of claim 1, wherein said at least one multi-fiber ferrule comprises two or more multi-fiber ferrules, and wherein said retainer comprises a plurality of second surfaces, each second surface configured to contact a first surface of one of said multi-fiber ferrules.

9. The connector of claim 1, further comprising a second connector.

10. The connector of claim 1, wherein said connector is a backplane connector.

11. The connector of claim 1, wherein said connector does not comprise a spring.

12. The connector of claim 1, wherein said retainer is connected to said first housing to hold said ferrule against said first housing.

13. The connector of claim 12 wherein said retainer comprises at least one alignment member configured to engage at least one corresponding alignment member of said first housing to align said retainer with said first housing.

* * * * *